Sept. 22, 1931.  G. I. RAWSON ET AL  1,824,296
VEHICLE AND TRAILER BRAKE
Filed Dec. 29, 1927

INVENTOR.
Grant I. Rawson &
Benjamin H. Jackson.
BY
ATTORNEY.

Patented Sept. 22, 1931

1,824,296

UNITED STATES PATENT OFFICE

GRANT I. RAWSON, OF ROYAL OAK, AND BENJAMIN H. JACKSON, OF CENTER LINE, MICHIGAN

VEHICLE AND TRAILER BRAKE

Application filed December 29, 1927. Serial No. 243,295.

Our invention relates to a new and useful improvement in a vehicle and trailer brake adapted for mounting principally on vehicles of the automotive type, and particularly that class with which a trailer is used.

The trailers or drawn vehicles which are quite commonly attached to and drawn by motor trucks are generally lacking brakes, so that the braking of the vehicle is all effected by the driven vehicle, with the result that frequent accidents occur due to the jamming of the drawing vehicle by the trailer or drawn vehicle.

It is an object of the present invention to provide a braking mechanism which may be installed on trailers and on the vehicle used for drawing the trailer, so that a retarding of the movement of the trailer may be effective simultaneously with the braking of the drawing vehicle.

Another object of the invention is the provision in a braking mechanism of a mechanism for applying the brakes through pressure.

Another object of the invention is the provision of a mechanism which may be mechanically operated should the pressure mechanism become defective.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention showing parts in side elevation.

Figure 1:
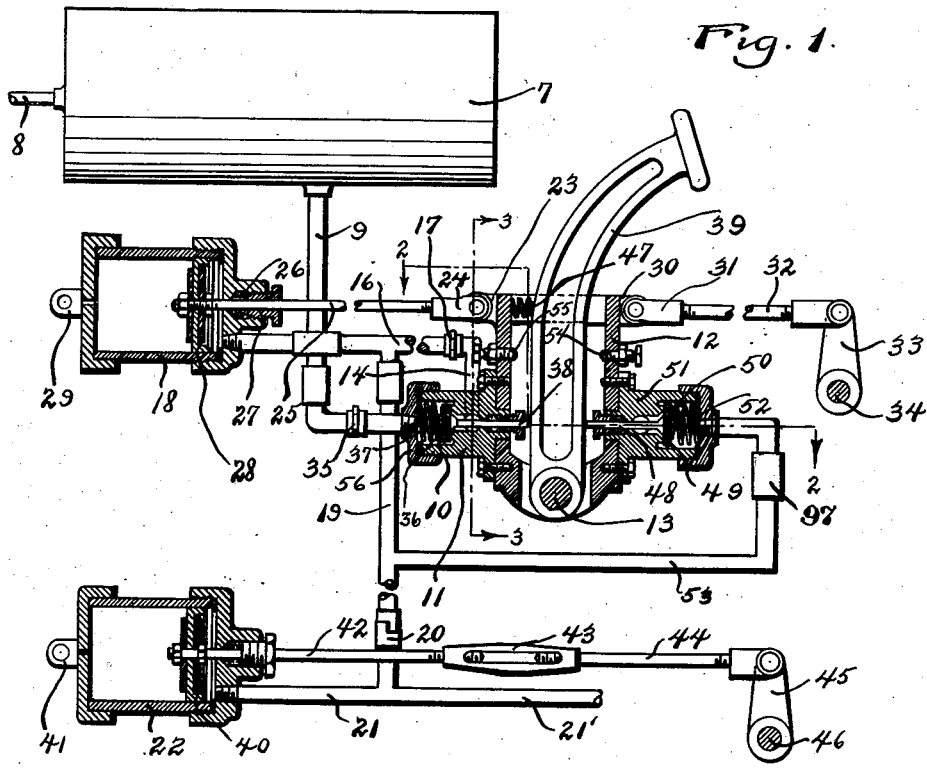
Figure 2:
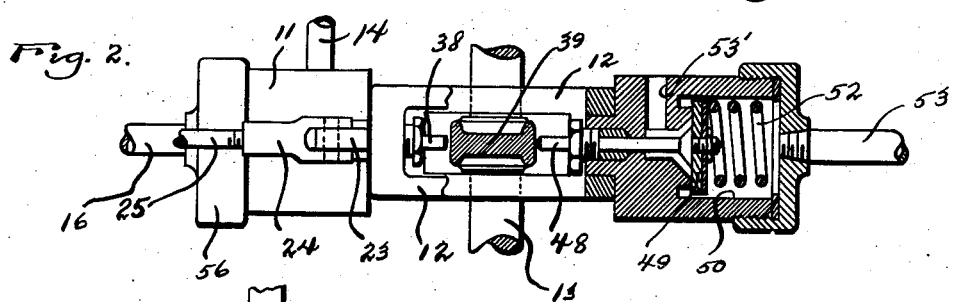
Fig. 2 is a fragmentary sectional view taken on line 2—2 of Fig. 1.
Figure 3:
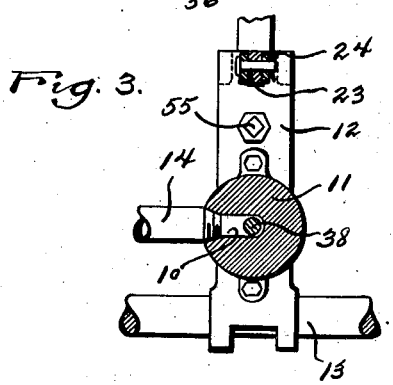
Fig. 3 is a fragmentary view taken on line 3—3 of Fig. 1.

In the drawings we have illustrated the mechanism in its assembled relation and the method of attaching the mechanism to a vehicle will be readily understood by those skilled in the art.

In the invention we use a pressure tank 7 having an inlet pipe 8 communicating therewith, and through which air or other suitable medium may be led into the tank 7 under the desired pressure. An outlet pipe 9 communicates with the tank 7 and leads into a chamber 10 in the housing 11, this housing 11 being suitably secured to a cage 12 which is rockingly mounted on the shaft 13, which extends transversely of and is suitably secured to the chassis or body of the vehicle. The chamber 10 communicates through the pipe 14 with the pipe 16 which is attached thereto by a suitable union 17. The pipe 16 communicates with the cylinder 18 and by the pipe 19 through a suitable union 20 and the pipe 21 with the cylinder 22. Attached pivotally at one end to a lug 23 projecting outwardly from the cage 12 is an arm 24 in which is threaded the piston rod 25 extending through the stuffing box 26 and the packing gland 27 into the cylinder 18. A piston 28 is attached to the piston rod 25 and adapted for slidable movement in the cylinder 18, this cylinder 18 being provided with a suitable lug 29 whereby it may be attached in fixed position on the vehicle with which used. Pivotally attached to the lug 30 on the cage 12 is an arm 31 in which is threaded the rod 32, this rod 32 being pivotally connected to the link 33 which is fixedly mounted upon the brake operating rod 34 of the vehicle.

As shown in Fig. 1, the pipe 9 has interposed therein a coupling 35. Slidably mounted in the housing 11 is a valve 36 which is normally held in closing position by the spring 37 so as to close communication between the pipe 9 and the pipe 14. A valve stem 38 projects outwardly from the housing 12 and is connected to the valve 36. Rockingly mounted on the shaft 13 is a lever 39 adapted, when rocked to one position, for engaging the valve stem 38 and forcing the same inwardly to move the valve 36 from its seat so as to establish communication between the pipe 9 and the pipe 14.

In operating the invention, the lever 39 would be rocked on its mountings when it is desired to apply the brake, thus moving the valve 36 from its seat. The movement of the valve 36 from its seat will establish communication between the tank 7 in which air or other suitable fluid is compressed, so that the piston 28 will be moved in the cylinder 18, thus causing the cage 12 to rock on the shaft 13 and effecting an axial movement of the rod 32 to rock the link 33 on the shaft 34, thus applying the brakes on the vehicle. At the same time, the fluid under pressure will be delivered through the pipe 19 into the cylinder 22 to effect a movement of the piston 40 in this cylinder 22, this cylinder 22 being provided with the lug 41 whereby it may be attached in fixed relation on the trailer with which used. The movement of the piston 40 will effect an axial movement of the piston rod 42 which is connected by the turn buckle 43 to the rod 44 connecting to the link 45 which is fixedly mounted upon the brake operating rod 46, so that an application of the brakes on the trailer will be effected at the same time the brakes are applied on the drawing vehicle. The pipe 21', when used, may extend to another trailer, the application on the other trailer being the same as already described, so that the brakes may be applied on a number of trailers when desired.

When the lever 39 is rocked so as to establish the necessary communication between the pipes 9 and 14 to cause the rocking of the cage 12, the cage, when rocked, will move into such a position that the valve 36 may again seat, thus retaining the brakes in applied position.

The spring 47 is adapted to engage at one end the cage 12 and at the other end the lever 39 so that when the pressure on the lever 39 is released after the brakes have been applied, this spring 47 will move the lever 39 backwardly on its pivot 13. The lever 39 will then engage the valve stem 48 which is attached to the valve 49 slidably positioned in the chamber 50 formed in the housing 51, the spring 52 normally retaining this valve 49 in closing position. A pipe 53 leads from the pipe 19 and communicates with the chamber 50. A passage 53' communicates with the chamber 50 so that the chamber 50 is in communication with the atmosphere when the valve 49 is moved from its seat. When the cage 12 is rocked on its pivot to apply the brakes and then the pressure on the lever 39 is released the engagement of the lever 39 with the stem 48 will move the valve 49 from its seat so that the air or other pressure which has been delivered to the cylinders 18 and 22 will be permitted to escape through the pipe 53 and the chamber 50, thus releasing the brakes.

In this manner there is provided a mechanism whereby the brakes on several vehicles may be applied when desired and retained in applied condition until the lever 39 is rocked into releasing position.

Threaded into the cage 12 are set screws 54 and 55, each of which is provided with a lock nut. Should any defect develop in the pressure system or in the piping or cylinders, these set screws 54 or 55 may be threaded inwardly so that a rocking of the lever 39 would engage the set screws 54 or 55 and effect a rocking of the cage 12, thus mechanically applying the brakes on the drawing vehicle by rocking the link 33. In this way there is provided an emergency arrangement for mechanically applying the brakes on the one vehicle.

By providing the coupling 35, access to the interior of the chamber 10 may be easily effected, it being but necessary to unthread the coupling 35 and remove the cap 56 to provide the floating mounting, the various pipes are provided with flexible connections 97.

While we have illustrated and described the preferred form of our invention we do not wish to limit ourselves to the precise details of structure shown, but desire to avail ourselves of such variations and modifications as come within the scope of the appended claims.

Having thus described our invention what we claim as new and desire to secure by Letters Patent is:

1. A brake mechanism of the class described, comprising: a reservoir for the reception of air under pressure; a cylinder; a piston slidably mounted in said cylinder; a connection between said piston and a brake beam with which used; means for connecting said cylinder and said reservoir in communication; a valve interposed in said connecting means for opening and closing said communication; a valve stem on said valve; and a rockably mounted operating lever engageable with the end of said valve stem, the rocking of said lever in one direction moving said valve to open position, said piston moving axially in said cylinder upon movement of said valve to open position, said valve moving, upon axial movement of said piston, away from said lever sufficient for permitting movement of said valve to closed position.

2. A brake mechanism of the class described, comprising: a reservoir for the reception of air under pressure; a cylinder; a piston slidably mounted in said cylinder; a connection between said piston and a brake beam with which used; means for connecting said cylinder and said reservoir in communication; a valve interposed in said connecting means for opening and closing said communication; a rockably mounted operating lever, the rocking of said lever in one direction moving said valve to open position, said piston moving axially in said cylinder upon movement of said valve to open position, said valve moving to closed position upon axial movement of said piston; an exhaust conduit connected to said cylinder and adapted for establishing communication of the same with the atmosphere; a valve for opening and closing communication of said cylinder with the atmosphere; and a stem on said valve adapted, after said axial movement of said cylinder, for engaging said lever upon return of the same to normal position, the engagement of said stem with said lever moving said valve to open position.

3. A brake mechanism of the class described, comprising: a rockably mounted cage; an operating lever pivotally mounted on the axis of mounting of said cage; a reservoir for the reception of air under pressure; a cylinder; a piston slidably mounted in said cylinder; means for connecting one side of said cage to said piston; means for connecting the opposite side of said cage to a brake beam with which used; a conduit for establishing communication between said reservoir and said cylinder; a valve mounted on said cage interposed in said conduit for controlling said communication; a stem on said valve, said lever engaging said stem upon rocking of said lever in one direction and moving said valve to open position, said cage rocking on its mountings upon axial movement of said piston in said cylinder; and resilient means for normally moving said valve to closed position, the rocking of said cage moving said valve stem out of engagement with said lever.

4. A brake mechanism of the class described, comprising: a rockably mounted cage; an operating lever pivotally mounted on the axis of mounting of said cage; a reservoir for the reception of air under pressure; a cylinder; a piston slidably mounted in said cylinder; means for connecting one side of said cage to said piston; means for connecting the opposite side of said cage to a brake beam with which used; a conduit for establishing communication between said reservoir and said cylinder; a valve mounted on said cage interposed in said conduit for controlling said communication; a stem on said valve, said lever engaging said stem upon rocking of said lever in one direction and moving said valve to open position, said cage rocking on its mountings upon axial movement of said piston in said cylinder; resilient means for normally moving said valve to closed position, the rocking of said cage moving said valve stem out of engagement with said lever; an exhaust conduit connected to said cylinder; a control valve interposed in said conduit and mounted on said cage; and a stem on said valve projecting inwardly of said cage, said stem, upon the rocking of said cage and the movement of said lever to normal position, engaging said lever and moving said second mentioned valve to open position.

In testimony whereof we have signed the foregoing specification.

GRANT I. RAWSON.
BENJAMIN H. JACKSON.